April 5, 1955  M. W. CROSS ET AL  2,705,552
FREE ACTION TAKE-OFF ADAPTER
Filed May 21, 1954  3 Sheets-Sheet 1
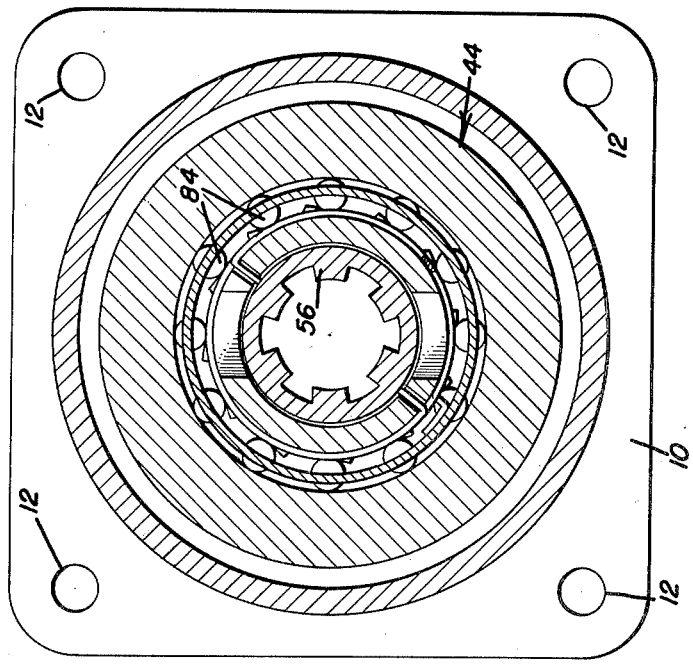
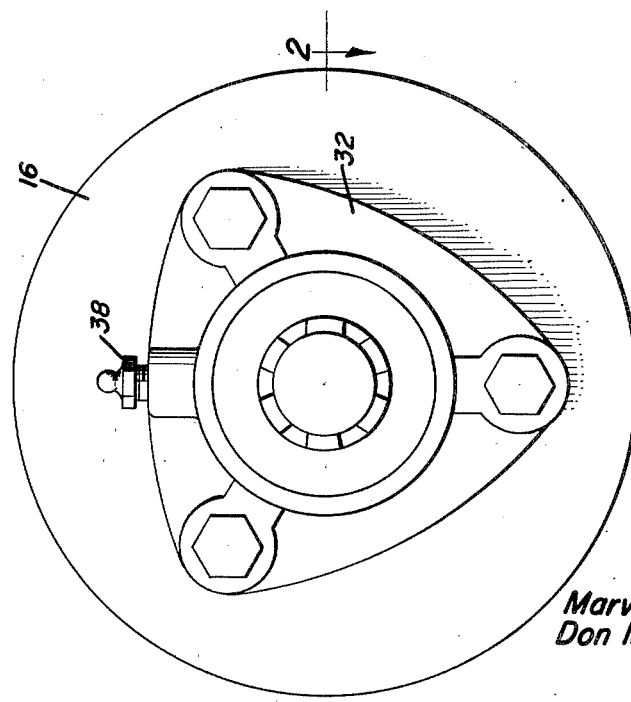
Marvin W. Cross
Don M. Mercer
INVENTORS

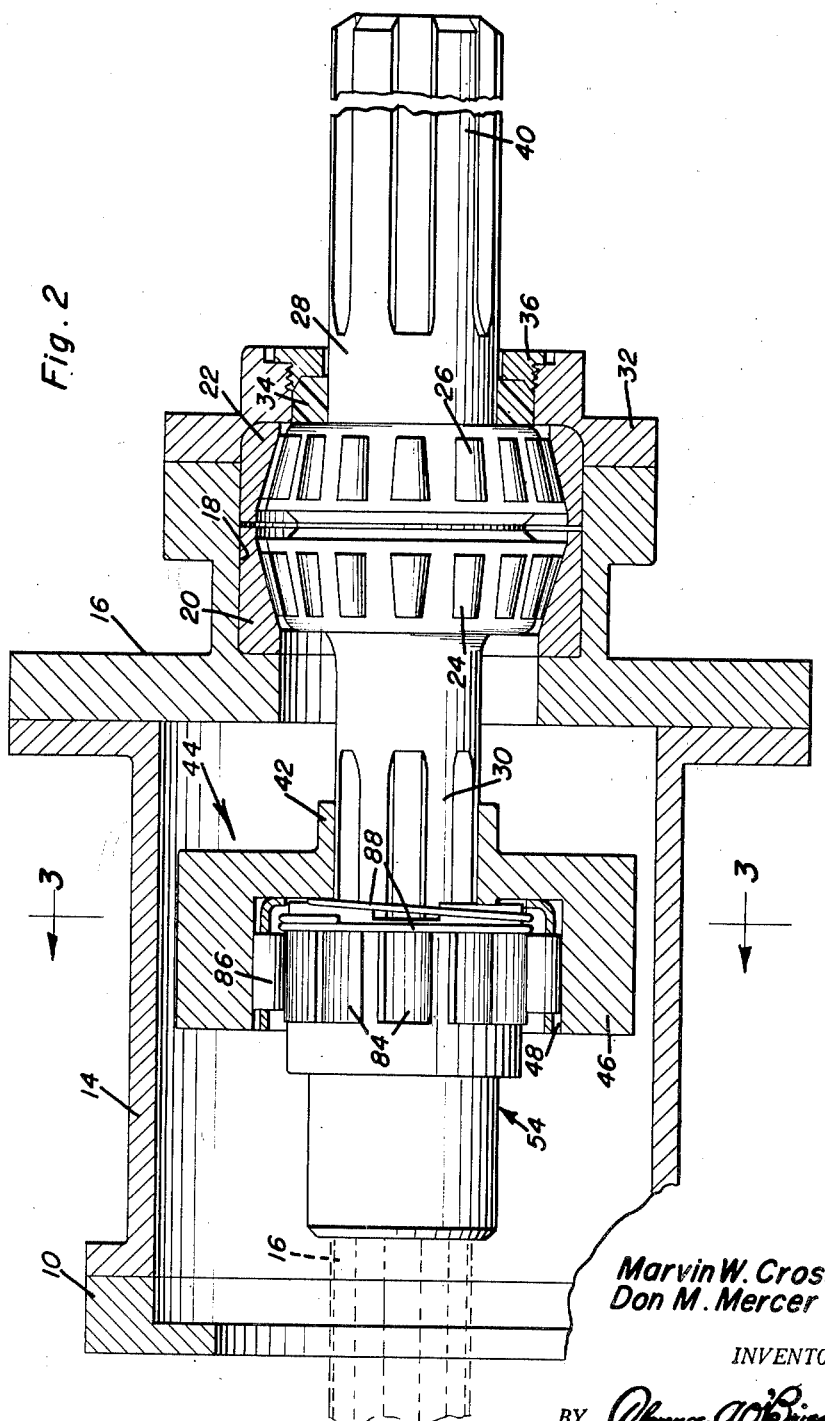

April 5, 1955　　M. W. CROSS ET AL　　2,705,552
FREE ACTION TAKE-OFF ADAPTER
Filed May 21, 1954　　　　　　　　　　3 Sheets-Sheet 3
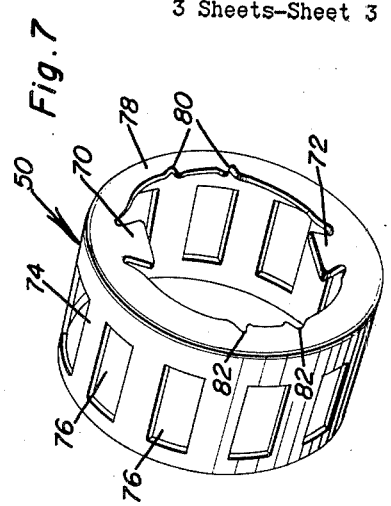
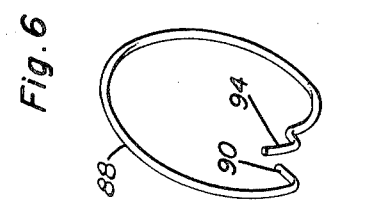
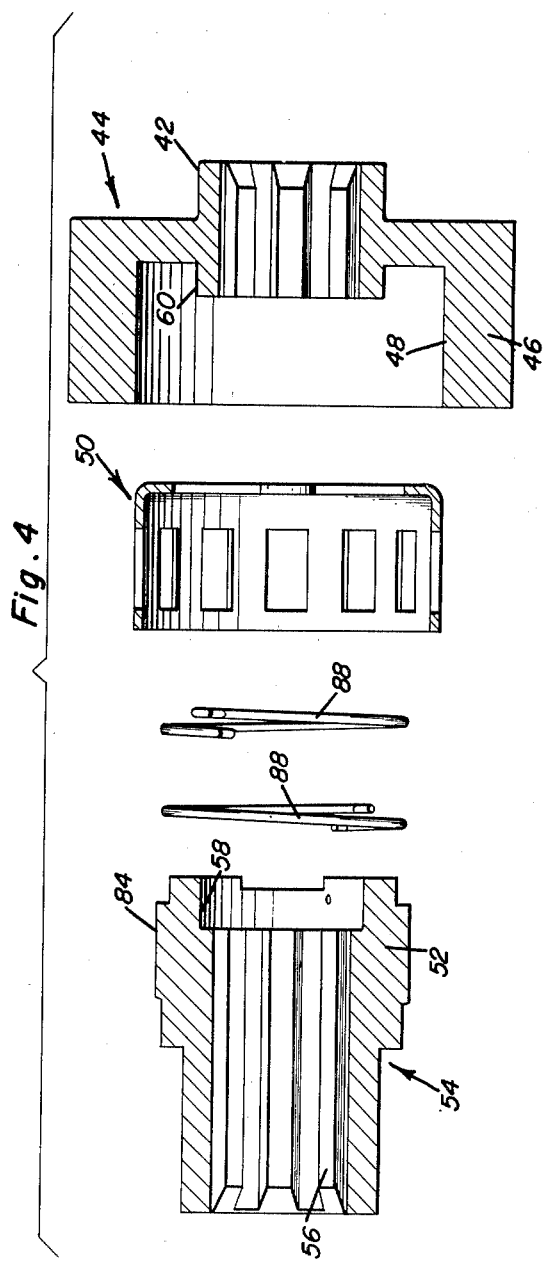
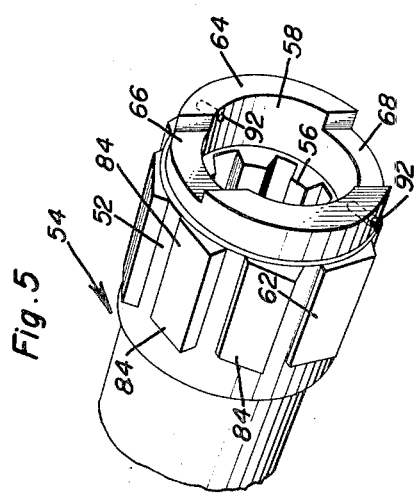
Marvin W. Cross
Don M. Mercer
INVENTORS

United States Patent Office 2,705,552
Patented Apr. 5, 1955

2,705,552

FREE ACTION TAKE-OFF ADAPTER

Marvin W. Cross, Stillwater, and Don M. Mercer, Perkins, Okla.

Application May 21, 1954, Serial No. 431,469

8 Claims. (Cl. 192—45)

This invention relates generally to agricultural machinery and pertains more particularly to an adapter or coupling unit to be used in connection with the power take-off shaft of a farm vehicle and has for its primary object the provision of an adapter utilized in conjunction with the power take-off shaft of a tractor or the like so as to enable the operator of the tractor to manipulate the transmission thereof while a machine driven by the power take-off is being operated.

Another object of the invention is to provide a coupling unit of the character described which will permit the driven mechanism, such as the combine, corn picker, ensilage cutter, weed cutter, or other similar machine to overrun the conventional power take-off shaft of the tractor enabling gear changes to be made in the tractor transmission while the momentum of the driven machine is causing the driven take-off shaft to continue rotating.

Another object of this invention is to provide the power take-off coupling unit adapted to be used in conjunction with the power take-off shaft of a tractor which will enable the operator of the tractor to bring the power take-off machine up to working speed before the forward motion of the tractor and its associated machine is started, thus relieving the tractor power plant of the strain of simultaneously bringing the take-off machine up to working speed and imparting forward motion to the tractor and attached machine.

Another object of this invention resides in the provision of a power take-off adapter unit in conformity with the foregoing objects which will permit a relatively small tractor to effectively do the work that is now required of a larger tractor by relieving the tractor power plant of the overloading action of simultaneously imparting rotation to the power take-off machine and initiating the forward motion of the tractor and the associated machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an end elevational view of the adapter;

Figure 2 is a longitudinal section taken through the adapter as indicated by section line 2—2 of Figure 1;

Figure 3 is a vertical transverse section taken substantially along the plane of section line 3—3 of Figure 2;

Figure 4 is an exploded sectional view of the overrunning clutch mechanism;

Figure 5 is a perspective view of the sleeve assembly;

Figure 6 is a perspective of one of the clutch springs; and

Figure 7 is a perspective view of the cage member.

Referring now more particularly to Figure 2, reference numeral 10 indicates the generally rectangular base plate member which, as will be seen from Figure 3, is provided with a plurality of openings 12 adapted to receive fasteners for securing the base plate to a tractor or like vehicle (not shown). Removably secured to the base plate is a cylindrical housing member 14 which is disposed concentrically of the associated power take-off shaft, which is indicated by the reference numeral 16 as illustrated by dotted lines in Figure 2. The free end of the housing member 14 is provided with an end plate member 16 having an annular recess 18 therein adapted to receive the outer races 20 and 22 of a pair of tapered roller bearing members 24 and 26 which journal a drive shaft 28 in the housing assembly, such that its inner end 30 projects within the portion 14. An end cap member 32 is removably secured to the member 16 and it is to be noted that suitable shims may be provided between the members 16 and 32 to vary the pre-tension adjustment on the bearings 24 and 26 in accordance with the manufacturer's specification. An annular sealing ring 34 is disposed around the shaft 28 and a suitable nut member 36 compresses the sealing ring into sealing engagement with the shaft to prevent leakage of lubricant from the assemblies, a conventional lubricant fitting member 38 being provided for introducing grease or other lubricant into the bearing.

The outer end 40 of the drive shaft 28 is provided with a plurality of splines for frictional and driving engagement with the power take-off machine employed with the tractor such as a combine, corn picker or the like. The inner end 30 of the shaft 28 is also provided with a plurality of splines which mate with and engage the internally splined hub portion 42 of a drum member indicated generally by the reference character 44.

As seen most clearly in Figure 4, the member 44 also includes an offset peripheral flange 46 presenting a recess or chamber 48 within which a cage member 50 and one end 52 of the sleeve member 54 are received. The sleeve 54 is provided with internal splines 56 for frictionally receiving the power take-off shaft 16 and is provided with an enlarged recess 58 at one end for receiving the portion 16 of the boss 42 which projects within the recess 48. The stated one end of the sleeve terminates in the diametrically opposed shoulder portion 62 and 64 which prevents the diametrically opposed slots 66 and 68 in its end face which cooperate and receive the inwardly projecting ears 70 and 72 of the cage 50 when the parts are in the normal assembled position.

As seen most clearly in Figure 7, the cage comprises a cylindrical side wall portion 74 having a series of circumferentially spaced rectangular openings 76 therein and have an end wall 78 from which the ears 70 and 72 project, the end wall 78 being also provided with diametrically opposed notches 80 and 82 the purpose of which will be presently apparent.

The end of the sleeve 54 is provided with a plurality of circumferentially spaced wedge shaped cams 84 upon which the cylindrical rollers 86 carried within the elongated opening 76 of the cage 50 rest such that drive may be imparted between the sleeve 54 and the drum 44 but may not be accomplished in the reverse direction. To normally maintain the rollers 86 in engagement with the cam 84 and the inner surface of the flange 46 of the drum 44, a pair of generally circular spring members 88 are provided. Each of the springs is provided with a radially inturned end portion 90 received in one of the two diametrically opposed radial bores 92 in the sleeve 54 and the opposite end of each spring is provided with an offset hook portion 94 engageable within one of the previously mentioned notches 80 or 82 of the cage 50. Since the slots 66 and 68 in the sleeve are of larger dimension than the ears 70 and 72 of the cage, a limited amount of rotational motion is permitted between these two members to selectively engage and disengage the drive between the sleeve and the cage as previously set forth.

The use of the above described with the conventional power take-off shaft of the tractor or similar vehicle will permit the operator to engage the power take-off drive to the driven machine while the tractor gear shift is in neutral so as to bring the machine to its normal rotational operating speed while the tractor is stationary. Then, the tractor engine may be slowed down while the power take-off machine continues to turn by a slow momentum substantially at its operating speed whereupon the tractor transmission is engaged and the entire unit brought into forward motion without requiring the tractor power plant to simultaneously deliver sufficient power for imparting the forward motion to the tractor and its associated power take-off machine and to operate the machine at its normal speed. This will also permit the tractor transmission gear to be shifted up or down while the assembly is moving.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A power take-off coupling unit comprising a housing adapted to be secured concentrically of a power take-off shaft, a drive shaft journalled in said housing and projecting from one end thereof, a drum member connected to the inner end of said drive shaft, said drum member including a peripheral flange portion defining a recess, a sleeve adapted to drivingly embrace a power take-off shaft, said sleeve having one end received in the recess of said drum member, a cage disposed concentrically of said one end of the sleeve within said recess, a plurality of circumferentially spaced cams formed on said one end of the sleeve, a plurality of rollers carried by said cage and engaged on said cam, said cage being connected to said sleeve for limited oscillation whereby said rollers will selectively engage and disengage the inner surface of said flange, and means for urging said cage rotationally with respect to said sleeve to normally engage said rollers with the inner surface of said flange.

2. A power take-off coupling unit comprising a housing adapted to be secured concentrically of a power take-off shaft, a drive shaft journalled in said housing and projecting from one end thereof, a drum member connected to the inner end of said drive shaft, said drum member including a peripheral flange portion defining a recess, a sleeve adapted to drivingly embrace a power take-off shaft, said sleeve having one end received in the recess of said drum member, a cage disposed concentrically of said one end of the sleeve within said recess, a plurality of circumferentially spaced cams formed on said one end of the sleeve, a plurality of rollers carried by said cage and engaged on said cam, said one end of the sleeve terminating in a pair of projecting portions defining a pair of diametrically opposed slots therebetween, said cage having a pair of inturned ears received in said slots such that the cage and sleeve are interconnected for limited oscillation whereby said rollers will selectively engage and disengage the inner surface of said flange, and means for urging said cage rotationally with respect to said sleeve to normally engage said rollers with the inner surface of said flange.

3. A power take-off coupling unit comprising a housing adapted to be secured concentrically of a power take-off shaft, a drive shaft journalled in said housing and projecting from one end thereof, a drum member connected to the inner end of said drive shaft, said drum member including a peripheral flange portion defining a recess, a sleeve adapted to drivingly embrace a power take-off shaft, said sleeve having one end received in the recess of said drum member, a cage disposed concentrically of said one end of the sleeve within said recess, a plurality of circumferentially spaced cams formed on said one end of the sleeve, a plurality of rollers carried by said cage and engaged on said cam, said cage being connected to said sleeve for limited oscillation whereby said rollers will selectively engage and disengage the inner surface of said flange, and means for urging said cage rotationally with respect to said sleeve to normally engage said rollers with the inner surface of said flange, said means constituting a circular spring member anchored at one end to said sleeve and at its other end to said cage.

4. A power take-off coupling unit comprising a housing adapted to be secured concentrically of a power take-off shaft, a drive shaft journalled in said housing and projecting from one end thereof, a drum member connected to the inner end of said drive shaft, said drum member including a peripheral flange portion defining a recess, a sleeve adapted to drivingly embrace a power take-off shaft, said sleeve having one end received in the recess of said drum member, a cage disposed concentrically of said one end of the sleeve within said recess, a plurality of circumferentially spaced cams formed on said one end of the sleeve, a plurality of rollers carried by said cage and engaged on said cam, said one end of the sleeve terminating in a pair of projecting portions defining a pair of diametrically opposed slots therebetween, said cage having a pair of inturned ears received in said slots such that the cage and sleeve are interconnected for limited oscillation whereby said rollers will selectively engage and disengage the inner surface of said flange, and means for urging said cage rotationally with respect to said sleeve to normally engage said rollers with the inner surface of said flange, said means constituting a circular spring member anchored at one end to said sleeve and at its other end to said cage.

5. A power take-off coupling unit comprising a housing adapted to be secured concentrically of a power take-off shaft, a drive shaft journalled in said housing and projecting from one end thereof, a drum member, said drum member having a boss portion slidably interfitting with the inner end of said drive shaft and having a peripheral flange defining a recess, a sleeve adapted to drivingly embrace a power take-off shaft, said sleeve having one end received in the recess of said drum member, a cage disposed concentrically of said one end of the sleeve within said recess, a plurality of circumferentially spaced cams formed on said one end of the sleeve, a plurality of rollers carried by said cage and engaged on said cam, said cage being connected to said sleeve for limited oscillation whereby said rollers will selectively engage and disengage the inner surface of said flange, and means for urging said cage rotationally with respect to said sleeve to normally engage said rollers with the inner surface of said flange.

6. A power take-off coupling unit comprising a housing adapted to be secured concentrically of a power take-off shaft, a drive shaft journalled in said housing and projecting from one end thereof, a drum member, said drum member having a boss portion slidably interfitting with the inner end of said drive shaft and having a peripheral flange defining a recess, a sleeve adapted to drivingly embrace a power take-off shaft, said sleeve having one end received in the recess of said drum member, a cage disposed concentrically of said one end of the sleeve within said recess, a plurality of circumferentially spaced cams formed on said one end of the sleeve, a plurality of rollers carried by said cage and engaged on said cam, said one end of the sleeve terminating in a pair of projecting portions defining a pair of diametrically opposed slots therebetween, said cage having a pair of inturned ears received in said slots such that the cage and sleeve are interconnected for limited oscillation whereby said rollers will selectively engage and disengage the inner surface of said flange, and means for urging said cage rotationally with respect to said sleeve to normally engage said rollers with the inner surface of said flange.

7. A power take-off coupling unit comprising a housing adapted to be secured concentrically of a power take-off shaft, a drive shaft journalled in said housing and projecting from one end thereof, a drum member, said drum member having a boss portion slidably interfitting with the inner end of said drive shaft and having a peripheral flange defining a recess, a sleeve adapted to drivingly embrace a power take-off shaft, said sleeve having one end received in the recess of said drum member, a cage disposed concentrically of said one end of the sleeve within said recess, a plurality of circumferentially spaced cams formed on said one end of the sleeve, a plurality of rollers carried by said cage and engaged on said cam, said cage being connected to said sleeve for limited oscillation whereby said rollers will selectively engage and disengage the inner surface of said flange, and means for urging said cage rotationally with respect to said sleeve to normally engage said rollers with the inner surface of said flange, said means constituting a circular spring member anchored at one end to said sleeve and at its other end to said cage.

8. A power take-off coupling unit comprising a housing adapted to be secured concentrically of a power take-off shaft, a drive shaft journalled in said housing and projecting from one end thereof, a drum member, said drum member having a boss portion slidably interfitting with the inner end of said drive shaft and having a peripheral flange defining a recess, a sleeve adapted to drivingly embrace a power take-off shaft, said sleeve having one end received in the recess of said drum member, a cage disposed concentrically of said one end of the sleeve within said recess, a plurality of circumferentially spaced cams formed on said one end of the sleeve, a plurality of rollers carried by said cage and engaged on said cam, said one end of the sleeve terminating in a pair of projecting portions defining a pair of diametrically opposed slots therebetween, said cage having a pair of inturned ears received in said slots such that the cage and sleeve are interconnected for limited oscillation whereby said rollers will selectively engage and disengage the inner surface of said flange, and means for urging said cage rotationally with respect to said sleeve to normally engage said rollers with the inner surface of said flange, said means constituting a circular spring member anchored at one end to said sleeve and at its other end to said cage.

References Cited in the file of this patent

UNITED STATES PATENTS

| | | |
|---|---|---|
| 2,001,668 | Maier | May 14, 1935 |
| 2,209,459 | Hill | July 30, 1940 |
| 2,289,646 | Grater | July 14, 1942 |
| 2,393,693 | Kelbel | Jan. 29, 1946 |
| 2,526,919 | Wilson | Oct. 24, 1950 |